US006978485B2

(12) United States Patent
Stude

(10) Patent No.: US 6,978,485 B2
(45) Date of Patent: Dec. 27, 2005

(54) ATTACHMENT, ASSEMBLY AND METHOD FOR HANDLESS PULLING OF A GOLFCART

(76) Inventor: Michael Stude, 1021 S. Grove Ave., Barrington, IL (US) 60010

( * ) Notice: Subject to any disclaimer, the term of this patent is extended or adjusted under 35 U.S.C. 154(b) by 57 days.

(21) Appl. No.: 10/753,304

(22) Filed: Jan. 8, 2004

(65) Prior Publication Data

US 2005/0150033 A1    Jul. 14, 2005

(51) Int. Cl.$^7$ ................................. A41F 9/00
(52) U.S. Cl. ......................... 2/312; 224/184
(58) Field of Search ............... 2/312, 69, 310–311, 2/338, 314–322, 336, 326, 327; 224/184, 224/251, 660

(56) References Cited

U.S. PATENT DOCUMENTS

| 2,559,981 | A | * | 7/1951 | McBride | 224/184 |
| 3,328,043 | A | * | 6/1967 | Johnson | 280/1.5 |
| 3,926,448 | A | * | 12/1975 | Reichard | 280/1.5 |
| 5,215,318 | A | * | 6/1993 | Capraro | 280/1.5 |
| 5,215,355 | A | * | 6/1993 | Klumpjan | 298/6 |
| 5,265,891 | A | * | 11/1993 | Diehl | 280/1.5 |
| 5,622,294 | A |   | 4/1997 | Evans | |

* cited by examiner

*Primary Examiner*—Tejash Patel
(74) *Attorney, Agent, or Firm*—Welsh & Katz, Ltd.

(57) ABSTRACT

The attachment is for use in an assembly for handless pulling of a golf cart, said attachment and comprises a short piece of tubing for placement on a belt and located on the belt between two loops on a pair of pants or shorts at the back or backside of the pair of pants or shorts, the loop being in position to receive a generally horizontally extending handle at the upper outer end of a golf cart frame member.

12 Claims, 3 Drawing Sheets

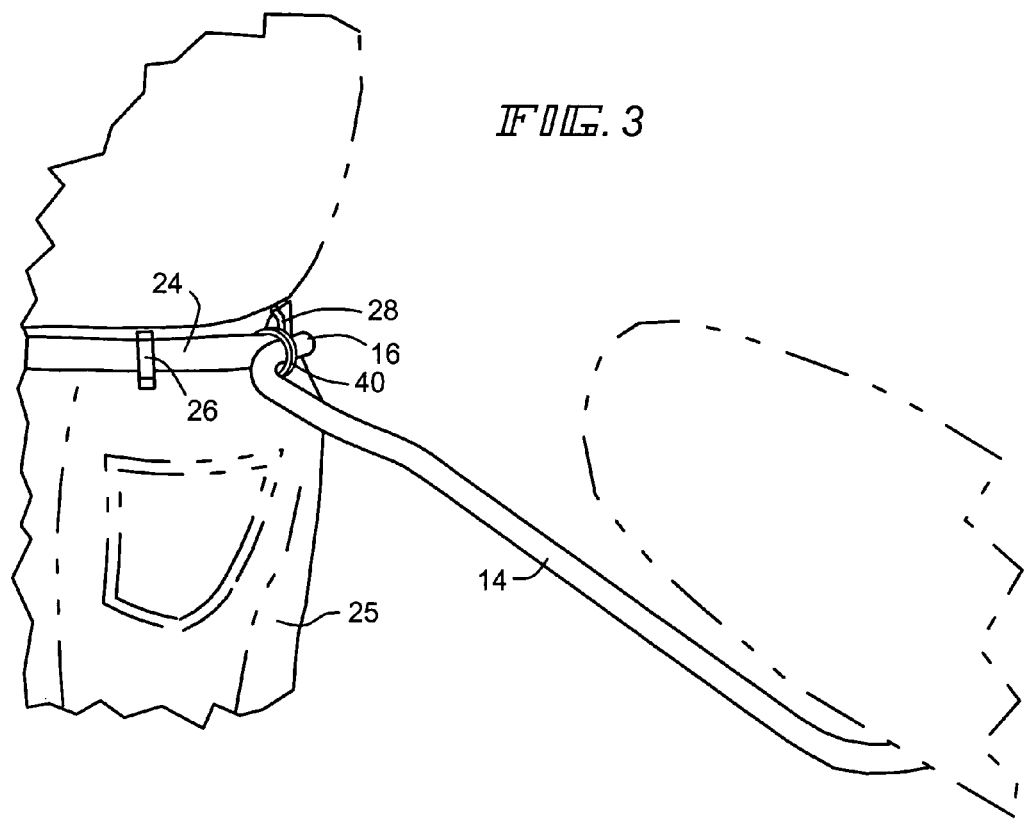
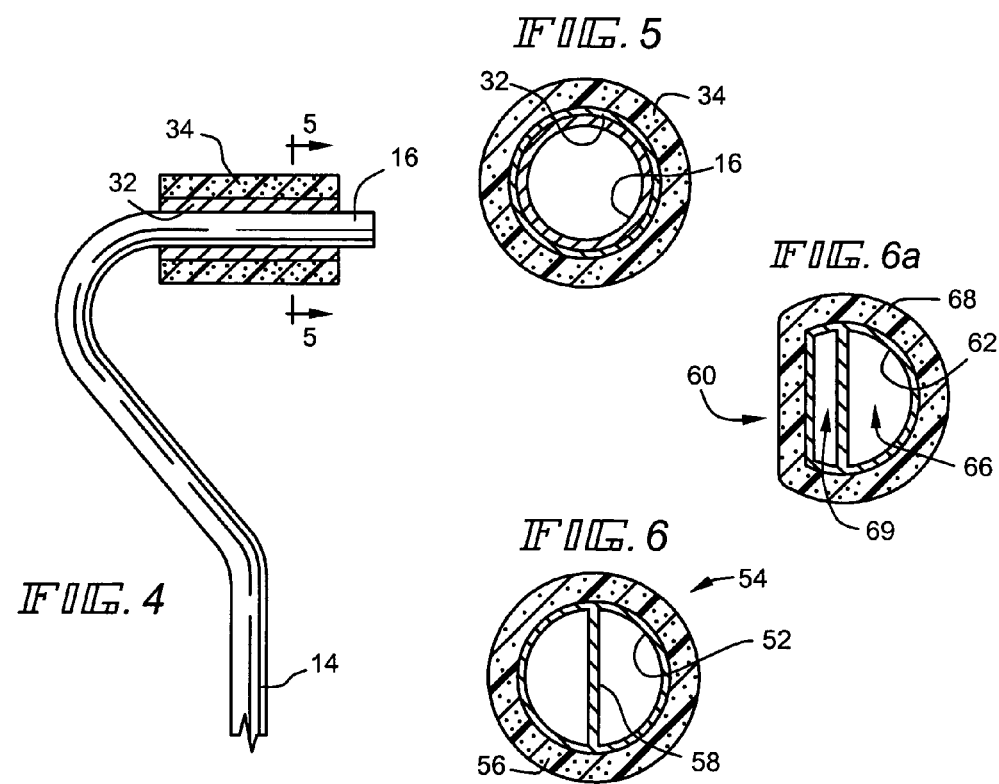

500
ATTACHMENT, ASSEMBLY AND METHOD FOR HANDLESS PULLING OF A GOLFCART

BACKGROUND OF THE INVENTION

1. Field of the Invention

The present invention relates to handless pulling of a golf cart by an individual with an assembly including a belt and an attachment on the belt in the form of a short section of tubing which is mounted on the belt between two belt loops on a pair of pants or shorts and which is adapted to receive a generally horizontally extending handle at an upper outer end of a golf cart frame.

2. Description of the Related Art

Heretofore it has been proposed to provide a golf cart towing device which surrounds the waist of the user and includes a belt, a buckle at one end of the belt, a buckle mating portion at the other end of the belt, a tubing and an elastic strap mounting the tubing and fixed to the belt. The tubing is fixed on and horizontally positioned on the belt outer surface between distal ends of the belt. The tube removably receives the handle of the golf cart. The tubing is mounted on the elastic strip which is stitched to the belt.

This golf cart pulling device is illustrated and described in U.S. Pat. No. 5,622,294.

BRIEF SUMMARY OF THE INVENTION

According to the invention there is provided an attachment for use in an assembly for handless pulling of a golf cart, said attachment comprising: a short piece of tubing for placement on a belt and located on the belt between two loops on a pair of pants or shorts at the back or backside of the pair of pants or shorts, the loop being in position to receive a generally horizontally extending handle at the upper outer end of a golf cart frame member

BRIEF DESCRIPTION OF THE SEVERAL VIEWS OF THE DRAWINGS

FIG. 3 is a perspective view of a belt, the tubing attachment comprising a simple tube, two belt loops on a portion of a pair of pants or shorts and a handle for a golf cart and is similar to the view shown in FIG. 1.

FIG. 4 is a longitudinal sectional view through the tubing and handle shown in FIGS. 1 and 2. 1 and 2 and shows a sleeve of padding on the tubing.

FIG. 5 is a sectional view through the tube shown in FIG. 4

FIG. 6 is a having two lumens, one for receiving the belt and the other for receiving the handle.

FIG. 6a is a transverse sectional view through another modified tubing having two lumens, one for receiving the belt and the other for receiving the handle.

DETAILED DESCRIPTION OF THE INVENTION

Figure 1:
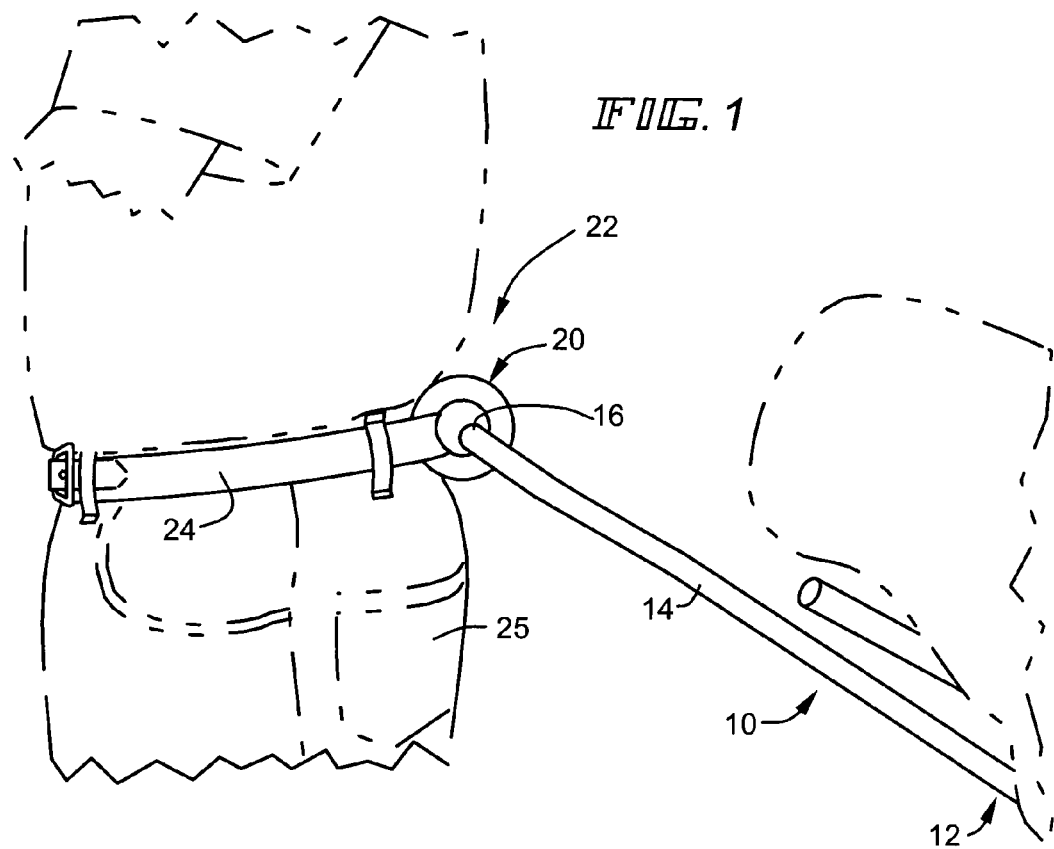
FIG. 1 is a side lavational view of an individual (in phantom) pulling a golf cart and shows an attachment in the form of a tubing with a sleeve a padding thereon of the present invention mounted on a belt of the individual wearing a pair of pants or shorts and shows the tubing receiving a handle of a golf cart.

Referring now to FIG. 1 in greater detail, there is illustrated therein a golf cart 10 having a frame work 12 that includes a tubular frame member 14 that extends upwardly from the golf cart and then in a generally L-shape to form a distal end portion 16 of the tubing which forms a handle 16 for the golf cart 10.

Figure 2:
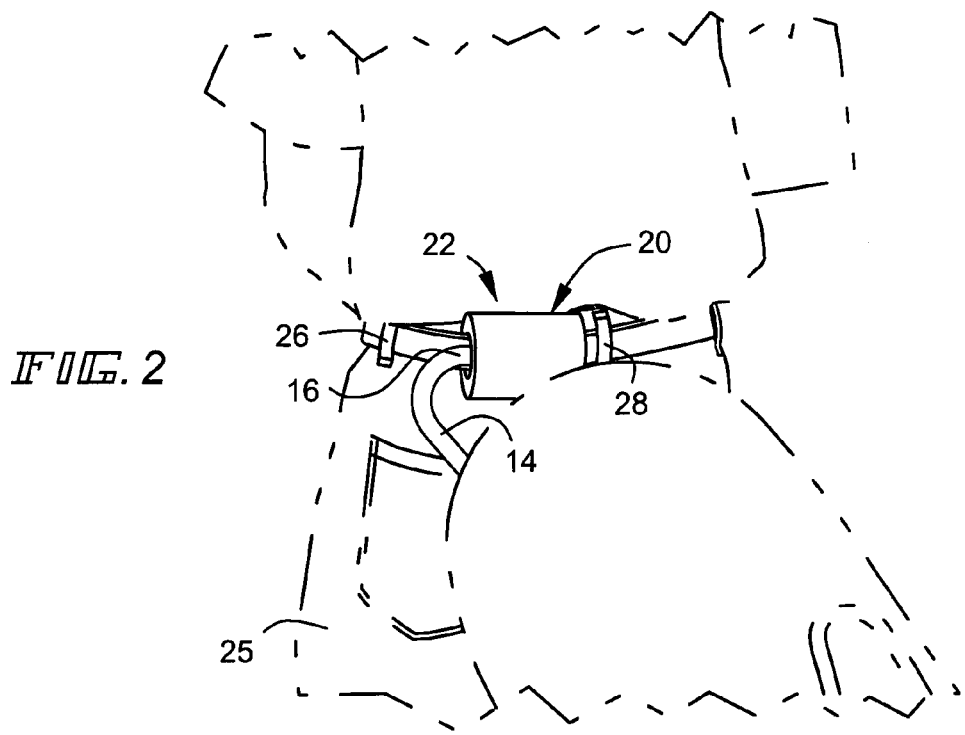
FIG. 2 is a back elevational view of the individual and golf cart shown in FIG. 1.

According to the teachings of the present invention the handle 16 at the upper end tubular frame member 14 of the golf cart 10 is received in a short piece of padded tubing 20 which forms an attachment 20 in a tubing attachment assembly 22 for the handless pulling of a golf cart. The assembly 22 includes the short piece of padded tubing 20 and a belt 24 which is received through the padded 20 tubing for supporting the tubing 22 on a pair of pants or shorts 25 at the back of or on the backside of the pair of pants or shorts 25 between two belt loops 26 and 28 (FIG. 2) of the pair of pants or shorts 25.

A cross section of the tubing 20 is shown in FIGS. 4 and 5 and preferably includes an inner tubing 32 made of polyvinyl chloride (PVC) or other plastic material and an outer pad, felt or cushion sleeve 34 for cushioning forces that are placed on the inner tubing 32 transmitted through the sleeve 34 to the body of the wearer of the short piece of tubing 20.

The sleeve 34 is fixed to the inner plastic tubing 32, such as with an adhesive.

The sleeve 34 can be made of sponge, soft plastic, soft rubber, felt, cloth or fiber and sufficiently thick to provide a cushion or padding effect.

The short piece of padded tubing 20 is preferably between 1 and 3 inches in length and preferably has a diameter between 1 and 2 inches.

The method for using the attachment/tubing 20 and the assembly 22 including same includes the steps of placing a conventional belt 24 through several loops 26, 28 in a pair or pants or shorts 25, placing the attachment/tubing 20 over one distal end of the belt 24 and locating it between two belt loops on the pair of pants or shorts 25; extending the belt 24 through the other belt loop or loops remaining and fastening the free distal end of the belt 24 to a belt buckle fixed to the other distal end of the belt so as to locate the attachment/tubing 20 between two belt loops 26, 28 on the pair of pants or shorts 25 on the back or at the backside of the pair of pants or shorts 25.

Figure 7:
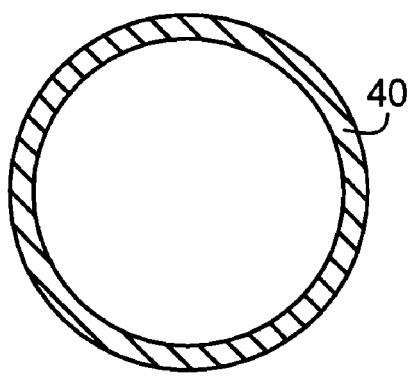
FIG. 7 is a transverse sectional view through the simple tube of FIG. 3.

If desired a simple tube 40 can be used as the tubing attachment as shown in FIGS. 3 and 7.

Further a modified bifurcated tubing attachment 50 including an inner, tubing 53 having a central wall 54 and an outer sleeve of padding 56 can be used as shown in FIG. 6.

Another form of bifurcated tubing attachment 60 is shown in FIG. 6a where a bifurcated, inner plastic tube 62 is partially circular and has a generally rectangular belt receiving, slot or lumen 64 and a semi-cylindrical, handle receiving, slot or lumen 66. The tube 64 is surrounded by an outer sleeve of padding 68.

Figure 8:
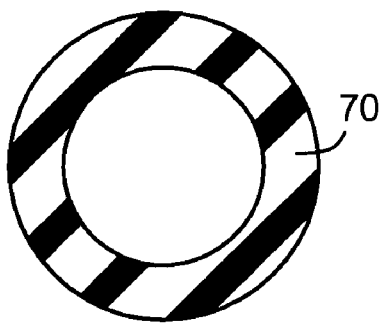
FIG. 8 is a transverse sectional view through a thicker rubber or plastic tube forming the tubing attachment.

A thicker solid tube 70, as shown in FIG. 8, can be used as the tubing attachment and is made of rubber or resilient plastic or foam material.

Figure 9:
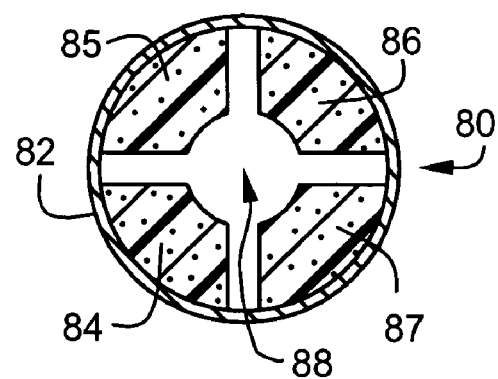
FIG. 9 is transverse sectional view through another modified tubing comprising a larger plastic tube with four, equally spaced, cushion segments within the plastic tube.

In FIG. 9 is shown a modified tubing attachment 80 comprising a larger plastic tube 82 and four, equally spaced, cushion segments 84, 85, 86 and 87 fixed within the plastic tube 82 and form a central cylinder lumen or envelope 88, of smaller diameter than the diameter of the handle 16, and are separated from each other so that the handle 16 can be pushed into the central lumen. In this way the handle 16 is secured on insertion into the tubing attachment 80. If desired, a sleeve of padding can be mounted on the outer surface of the plastic tube 82. Also, in this embodiment, the belt is first place in the slot formed between the upper two and lower two of the cushion segments 84, 85, 86 and 87 and the handle is forced into part of the lumen 88.

It is to be understood that the tubing attachment can be made of one or several materials including plastic, rubber, cloth, gauze, canvass, metals, aluminum etc.

Further cross section of the tube of the tubing attachment can be circular, square, partially circular or multisided or any shape that can receive the handle 16. Also the tube can have structure such as a ridge on the interior thereof, padding material on the inside or outside and indicia on the outer surface of the tube.

From the foregoing description, it will be apparent that the assembly for handless pulling of a golf cart and particularly the tubing 20 or the other described tubing attachments and tubes forming a part thereof have a number of advantages some of which have been described above and others of which are adherent in the invention.

Also, the exact size, shape, length and diameter of the tubing 20 or the other described tubing attachments and tubes can be altered as desired by the user to provide an appropriate keeper for a handle 16 at the upper end of a tubular frame member 14 of a golf cart.

Accordingly the scope of the invention is only to be limited as necessitated by the accompanying claims.

I claim:

1. An attachment for use in an assembly for handless pulling of a golf cart, said attachment comprising:
   a short piece of tube or tubing for placement on a belt and located on the belt between two loops on a pair of pants or shorts at the back or backside of the pair of pants or shorts,
   said tube or tubing being bifurcated to provide a belt-receiving lumen and a handle receiving lumen, and
   said handle receiving lumen being in position to receive a generally horizontally extending handle at the upper outer end of a golf cart frame member.

2. The attachment of claim 1, wherein said tubing has an inner diameter between 1 and 2 inches.

3. The attachment of claim 1, wherein said tubing has a length of between 1 and 3 inches.

4. The attachment of claim 1, wherein said tubing is flexible.

5. The attachment of claim 1, wherein said tubing has padding material on the exterior surface thereof.

6. The attachment of claim 5 wherein said padding material is defined by a cushion sleeve made of one of sponge, soft plastic, soft rubber, felt, cloth, gauze or fiber.

7. The attachment of claim 1, wherein said handle receiving lumen has padding material on the interior surface thereof.

8. The attachment of claim 1, wherein said handle receiving lumen has cushion insert material therein defining an inner lumen having a smaller diameter than the diameter of the handle received therein so that the handle is secured on placement into the tubing.

9. The attachment of claim 1, wherein said tubing is made of resilient material.

10. The attachment of claim 1, wherein said tubing has indicia on an outer surface thereof.

11. An assembly for handless pulling of a golf cart including a belt positioned on a pair of pants or shorts; an attachment on the belt in the form of a belt receiving lumen of a bifurcated section of tubing which is located on the belt between two belt loops on the pair of pants or shorts located on the backside of the pair of pants or shorts whereby a handle receiving lumen of the section of tubing is in position to receive a generally horizontally extending handle at the upper outer end of a golf cart frame member.

12. A method for pulling a golf cart including the steps of:
   placing a belt through several belt loops on a pair of pants or shorts;
   providing a bifurcated section of tubing having a belt receiving lumen and a handle receiving lumen;
   inserting the belt receiving lumen of the section of tubing on the belt;
   locating the section of tubing between two adjacent belt loops on a backside or at back of the pair of pants or shorts;
   pulling the free end of the belt through the remaining belt loop or loops of the pair of pants or shorts;
   fixing the free end of the belt to a belt buckle on the belt; and,
   placing a generally horizontally extending handle at the upper outer end of a frame member of a golf cart into the handle receiving lumen of the section of tubing so that the individual wearing the belt and tubing can pull a golf cart without using his or her hands.

* * * * *